US011138465B2

(12) United States Patent
Ozog et al.

(10) Patent No.: US 11,138,465 B2
(45) Date of Patent: Oct. 5, 2021

(54) SYSTEMS AND METHODS FOR TRANSFORMING COORDINATES BETWEEN DISTORTED AND UNDISTORTED COORDINATE SYSTEMS

(71) Applicant: Toyota Research Institute, Inc., Los Altos, CA (US)

(72) Inventors: Paul J. Ozog, Ann Arbor, MI (US); Schuyler H. Cohen, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 114 days.

(21) Appl. No.: 16/709,440

(22) Filed: Dec. 10, 2019

(65) Prior Publication Data
US 2021/0174139 A1 Jun. 10, 2021

(51) Int. Cl.
*G06K 9/00* (2006.01)
*G06K 9/62* (2006.01)
(Continued)

(52) U.S. Cl.
CPC .......... *G06K 9/6251* (2013.01); *G01C 21/32* (2013.01); *G06K 9/00791* (2013.01); *G06K 9/66* (2013.01); *G06N 5/027* (2013.01)

(58) Field of Classification Search
CPC .... G06K 9/6251; G06K 9/66; G06K 9/00791; G01C 21/32; G01C 21/3667;
(Continued)

(56) References Cited

U.S. PATENT DOCUMENTS 4,660,037 A * 4/1987 Nakamura ......... G01C 21/3667
340/988
5,995,902 A * 11/1999 Monson ............... G05D 1/0278
345/442
(Continued)

FOREIGN PATENT DOCUMENTS

CN 108051002 A * 5/2018
CN 109164412 A * 1/2019
(Continued)

OTHER PUBLICATIONS

Arun et al., "Least-Squares Fitting of Two 3-D point Sets", IEEE Transactions on Pattern Analysis and Machine Intelligence vol. PAMI-9, No. 5 (1987).
(Continued)

*Primary Examiner* — Mahendra R Patel
(74) *Attorney, Agent, or Firm* — Christopher G. Darrow; Darrow Mustafa PC

(57) ABSTRACT

System, methods, and other embodiments described herein relate to associating coordinates between separate coordinate systems. In one embodiment, a method includes acquiring location coordinates of a vehicle in a surrounding environment according to sensor data from at least one sensor of the vehicle. The method includes transforming reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum. The method includes generating, using the first intermediate coordinates and the second intermediate coordinates, an estimated transform for converting between the first coordinate system and the second coordinate system. The method includes projecting one or more (Continued)

annotations encoded in the second coordinate system into the first coordinate system using the estimated transform.

20 Claims, 4 Drawing Sheets

(51) Int. Cl.
  *G06K 9/66* (2006.01)
  *G01C 21/32* (2006.01)
  *G06N 5/02* (2006.01)

(58) Field of Classification Search
  CPC ...... G06N 5/027; G05D 1/0268; G05D 1/027;
  F16L 2101/30
  USPC .......................................................... 382/100
  See application file for complete search history.

(56) References Cited

U.S. PATENT DOCUMENTS

| | | | |
|---|---|---|---|
| 9,002,098 B1 | 4/2015 | Chelian et al. | |
| 9,183,631 B2 | 11/2015 | Taguchi et al. | |
| 9,224,053 B1* | 12/2015 | Ferguson | G06K 9/6288 |
| 10,953,985 B2* | 3/2021 | Hackert | A01B 79/005 |
| 2005/0057647 A1* | 3/2005 | Nowak | G06T 7/80 |
| | | | 348/116 |
| 2005/0116948 A1* | 6/2005 | Joe | G06T 17/20 |
| | | | 345/421 |
| 2005/0159886 A1* | 7/2005 | Kim | G01C 21/32 |
| | | | 701/455 |
| 2007/0067103 A1* | 3/2007 | Fukumoto | G01C 21/3638 |
| | | | 701/436 |
| 2010/0017115 A1* | 1/2010 | Gautama | G01C 15/00 |
| | | | 701/533 |
| 2015/0153170 A1* | 6/2015 | Gonzalez | G01B 21/22 |
| | | | 701/300 |
| 2018/0210087 A1* | 7/2018 | Olson | G01S 17/89 |
| 2019/0225267 A1* | 7/2019 | Ohtani | B60W 30/06 |
| 2019/0271780 A1* | 9/2019 | Bravo Orellana | G01S 7/4808 |
| 2020/0070834 A1* | 3/2020 | Mizoguchi | G08G 1/167 |
| 2020/0193170 A1* | 6/2020 | Braybrook | B60R 11/04 |
| 2020/0257295 A1* | 8/2020 | Park | G05D 1/0202 |
| 2021/0158564 A1* | 5/2021 | Chakravarty | G06K 7/1417 |

FOREIGN PATENT DOCUMENTS

| | | | | |
|---|---|---|---|---|
| WO | WO-2018140748 A1 * | 8/2018 | | G01S 17/42 |
| WO | WO-2020044619 A1 * | 3/2020 | | G01C 21/28 |

OTHER PUBLICATIONS

Pomerleau et al., "A Review of Point Cloud Registration Algorithms for Mobile Robotics", Foundations and Trends in Robotics, Now Publishers, 2015, 4 (1), pp. 1-104.
Zhang et al. "Convergence and Consistency Analysis for 3D invariant-EKF SLAM", found at: arXiv:1702.06680v1 [cs.RO] Feb. 22, 2017.
Thunberg et al. "Consensus and Formation Control on SE(3) for Switching Topologies", found at: arXiv:1511.00240v1 [math.OC] Nov. 1, 2015.
Ahuja et al. "3D Scan Registration using Curvelet Features in Planetary Environments", found at: arXiv:1509.07075v1 [cs.CV] Sep. 23, 2015.

* cited by examiner

SYSTEMS AND METHODS FOR TRANSFORMING COORDINATES BETWEEN DISTORTED AND UNDISTORTED COORDINATE SYSTEMS

TECHNICAL FIELD

The subject matter described herein relates, in general, to transforming coordinates between different coordinate systems, and, more particularly, to estimating a transform that optimally relates coordinates in a distorted two-dimensional map projection with an undistorted three-dimensional Cartesian coordinate system.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired data to detect a presence of objects and other features of the surrounding environment. Different vehicle systems may use this sensor data for perceiving the noted objects and performing various actions such as obstacle detection/avoidance, etc. Moreover, the vehicle may use the sensor data to determine a location within the environment by localizing into a defined map. The map may be based on a two-dimensional map (e.g., longitude and latitude) projection of the Earth with a third dimension derived according to elevation.

In general, the further the vehicle develops awareness about a surrounding environment, the better the vehicle may supplement a driver with information to assist in driving and/or the better an autonomous/semi-autonomous system can control the vehicle to avoid hazards. As such, the vehicle may use additional information about the surrounding environment such as locations and numbers of traffic lights, point-of-interest locations, and so on that is generally available through previously annotated mappings to facilitate this awareness. However, relating the location of the vehicle to annotations that define the additional information can represent particular difficulties since such information is often encoded in a separate coordinate system such as a three-dimensional Cartesian coordinate system that is based on geodetic data (e.g., Earth-centered, Earth-fixed (ECEF) coordinates). That is, the vehicle may localize into a distorted two-dimensional map projection (e.g., Universal Transverse Mercator), while the annotations are encoded in an undistorted coordinate system. As such, transforming coordinates of the annotations into the distorted 2D mapping or transforming the vehicle location into the undistorted geodetic-based mapping can represent significant difficulties.

SUMMARY

Example systems and methods disclosed herein relate to associating coordinates between a distorted/approximate Cartesian coordinate system and an undistorted Cartesian coordinate system. In one or more embodiments, a disclosed approach improves determining a transform for converting coordinates from a first coordinate system that is not distorted to a second coordinate system that is distorted. For example, in one aspect, the approach initially involves a vehicle or other device localizing within an environment according to a point cloud or other sensor data that is defined according to a first coordinate system such as the Universal Transverse Mercator (UTM) coordinate system. The approach then determines reference coordinates associated with, for example, a sensing horizon of the vehicle. The reference coordinates serve to separately relate the first coordinate system and the second coordinate system to a frame of reference of the vehicle. Thus, the approach involves transforming the reference coordinates separately into the respective coordinate systems using algorithms that are particular to each coordinate system.

Transforming the reference coordinates generates first and second intermediate coordinates associated with the respective coordinate systems. Accordingly, the approach uses the first and second intermediate coordinates to generate an optimal transform for approximating a relationship between the first coordinate system and the second coordinate system. In general, because the first coordinate system is a distorted projection of a 2D map and the second coordinate system is a non-distorted geodetic-based coordinate system, a single determinative transform is generally not feasible. Thus, in one aspect, the indicated analysis involves applying a least-squares algorithm that includes an objective cost function to minimize errors relative to the reference coordinates. A result of the analysis is an estimated transform that is, for example, a rigid body transform belonging to the special Euclidean group SE(3) that is an optimal approximation for relating the two disparate coordinate systems.

Subsequently, the vehicle or other device/system can use the estimated transform to project coordinates between the first and second coordinate systems with reasonable accuracy (e.g., millimeter-range differences). The coordinates can be, for example, coordinates of annotations from a defined mapping about various known aspects of the surrounding environment. In further applications, the disclosed approach can generate the estimated transform to relate visualizations, map data in a first coordinate system into a second coordinate system, and so on. In this way, the disclosed approach improves the process of converting coordinates between distorted and non-distorted coordinate systems.

In one embodiment, a transformation system for relating coordinates between separate coordinate systems is disclosed. The system includes one or more processors and a memory communicably coupled to the one or more processors. The memory stores an input module including instructions that when executed by the one or more processors cause the one or more processors to acquire location coordinates of a vehicle in a surrounding environment according to sensor data from at least one sensor of the vehicle. The input module includes instructions to transform reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum. The memory stores a conversion module including instructions that when executed by the one or more processors cause the one or more processors to generate, using the first intermediate coordinates and the second intermediate coordinates, an estimated transform for converting input coordinates between the first coordinate system and the second coordinate system, the input coordinates being encoded in the first coordinate system or the second coordinate system. The conversion module includes instructions to project one or more annotations encoded in the second coordinate system into the first coordinate system using the estimated transform.

In one embodiment, a non-transitory computer-readable medium for relating coordinates between separate coordinate systems and including instructions that when executed by one or more processors cause the one or more processors to perform one or more functions is disclosed. The instructions include instructions to acquire location coordinates of a vehicle in a surrounding environment according to sensor data from at least one sensor of the vehicle. The instructions include instructions to transform reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum. The instructions include instructions to generate, using the first intermediate coordinates and the second intermediate coordinates, an estimated transform for converting input coordinates between the first coordinate system and the second coordinate system, the input coordinates being encoded in the first coordinate system or the second coordinate system.

In one embodiment, a method for relating coordinates between separate coordinate systems is disclosed. In one embodiment, the method includes acquiring location coordinates of a vehicle in a surrounding environment according to sensor data from at least one sensor of the vehicle. The method includes transforming reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum. The method includes generating, using the first intermediate coordinates and the second intermediate coordinates, an estimated transform for converting between the first coordinate system and the second coordinate system. The method includes projecting one or more annotations encoded in the second coordinate system into the first coordinate system using the estimated transform

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
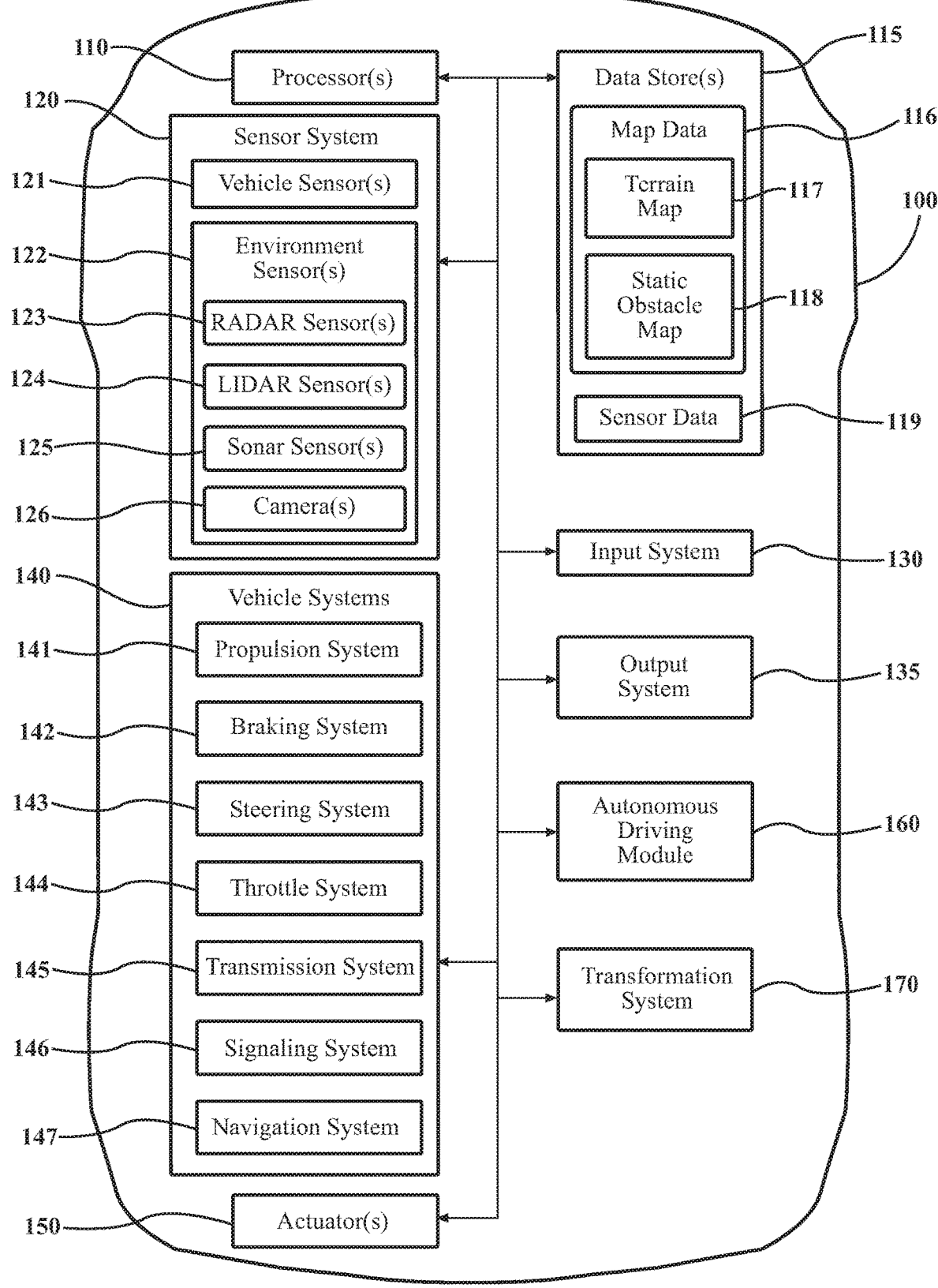
FIG. 1 illustrates one embodiment of a vehicle within which systems and methods disclosed herein may be implemented.

Systems, methods, and other embodiments associated with relating coordinates between a first coordinate system (e.g., a distorted Cartesian coordinate system) and a second coordinate system (e.g., an undistorted Cartesian coordinate system) are disclosed. As previously noted, devices such as vehicles may localize into a map according to a first coordinate system, but because annotations about additionally defined information may be encoded in a second coordinate system, the information may not be directly available for use by the vehicle. This is especially true in an instance where the first coordinate system is projected onto a two-dimensional map (e.g., UTM), and, therefore, results in distortion. That is, because an explicit transformation between a distorted coordinate system and an undistorted coordinate system is not typically feasible, converting coordinates for annotations or features between such coordinates systems is generally inaccurate and/or computationally intensive.

Therefore, in one embodiment, a transformation system is disclosed that converts coordinates between distorted and undistorted coordinates systems. For example, in one aspect, the transformation system initially localizes within an environment according to sensor data that generally correlates with a distorted coordinate system. That is, the reference for localizing the vehicle or other device using the sensor data may be a distorted two-dimensional mapping that, for example, provides a defined east/west and north/south coordinate plane while projecting altitude from a surface of the coordinate plane. However, because the coordinate system is a projection of the earth into a two-dimensional plane, the resulting coordinate system is distorted relative to a true Geodetic datum. As such, when attempting to convert between the distorted coordinate system and an undistorted coordinate system, traditional explicit transforms encounter difficulties with inaccuracies.

Thus, the transformation system uses, in one or more embodiments, a multi-step approach that includes first determining reference coordinates associated with, for example, a sensing horizon of the vehicle. The sensing horizon generally defines boundaries for a perceivable environment of the vehicle and, thus, the transformation system selects the reference coordinates at the sensing horizon to provide a reference relative to a boundary of the perceived environment. The reference coordinates serve to separately relate the first coordinate system and the second coordinate system to a frame of reference of the vehicle. Thus, the transformation system transforms the reference coordinates separately into the respective coordinate systems using algorithms that are particular to each coordinate system. For example, the transformation system uses a rigid-body transform to convert the reference coordinates (e.g., three standard basis vectors) into first intermediate coordinates in the first coordinate system and uses an iterative conversion to generate the second intermediate coordinates in the second coordinate system.

Once the transformation system generates coordinates in each separate coordinate system according to the reference coordinates, the system analyzes the set of coordinates to estimate an optimal transform for converting between the coordinates systems. The transformation system, in one aspect, uses a least-squares analysis that includes an objective cost function configured to minimize errors relative to the reference coordinates. A result of the analysis is an estimated transform that is, for example, a rigid-body transform belonging to the special Euclidean group SE(3) that is an approximation providing an optimal conversion between the two coordinate systems.

Subsequently, the transformation system can use the estimated transform to project coordinates between the first and second coordinate systems with approximate accuracy (e.g., millimeter-range differences). By way of example, as the vehicle detects features in the environment for which additional information may be available in a mapping defined according to a separate undistorted coordinate system, the transformation system can generate the estimated transform and convert the coordinates in order to integrate the information into a frame of reference of the vehicle. In further applications, the disclosed approach can generate the estimated transform to relate visualizations, map data in a first coordinate system into a second coordinate system without an explicit real-world localization, and so on. In this way, the disclosed approach improves the conversion of coordinates between distorted and non-distorted coordinate systems.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles, but embodiments are discussed in relation to automobiles as one example of a device that benefits from the presently disclosed approach. In some implementations, the vehicle 100 may be any form of transport that, for example, uses information provided in a first coordinate system and relates information from a second coordinate system into the first coordinate system as outlined herein, and thus benefits from the functionality discussed herein.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services). That is, in one or more approaches, the vehicle 100 may include one or more modules of the transformation system 170 while other modules are embodied in a cloud-computing environment or as a remote server entity.

Some of the possible elements of the vehicle 100 are shown in FIG. 1 and will be described along with subsequent figures. However, a description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements. In either case, as illustrated, the vehicle 100 includes a transformation system 170 that functions to convert coordinates between disparate coordinate systems as will become apparent with the discussion of the subsequent figures.

Figure 2:
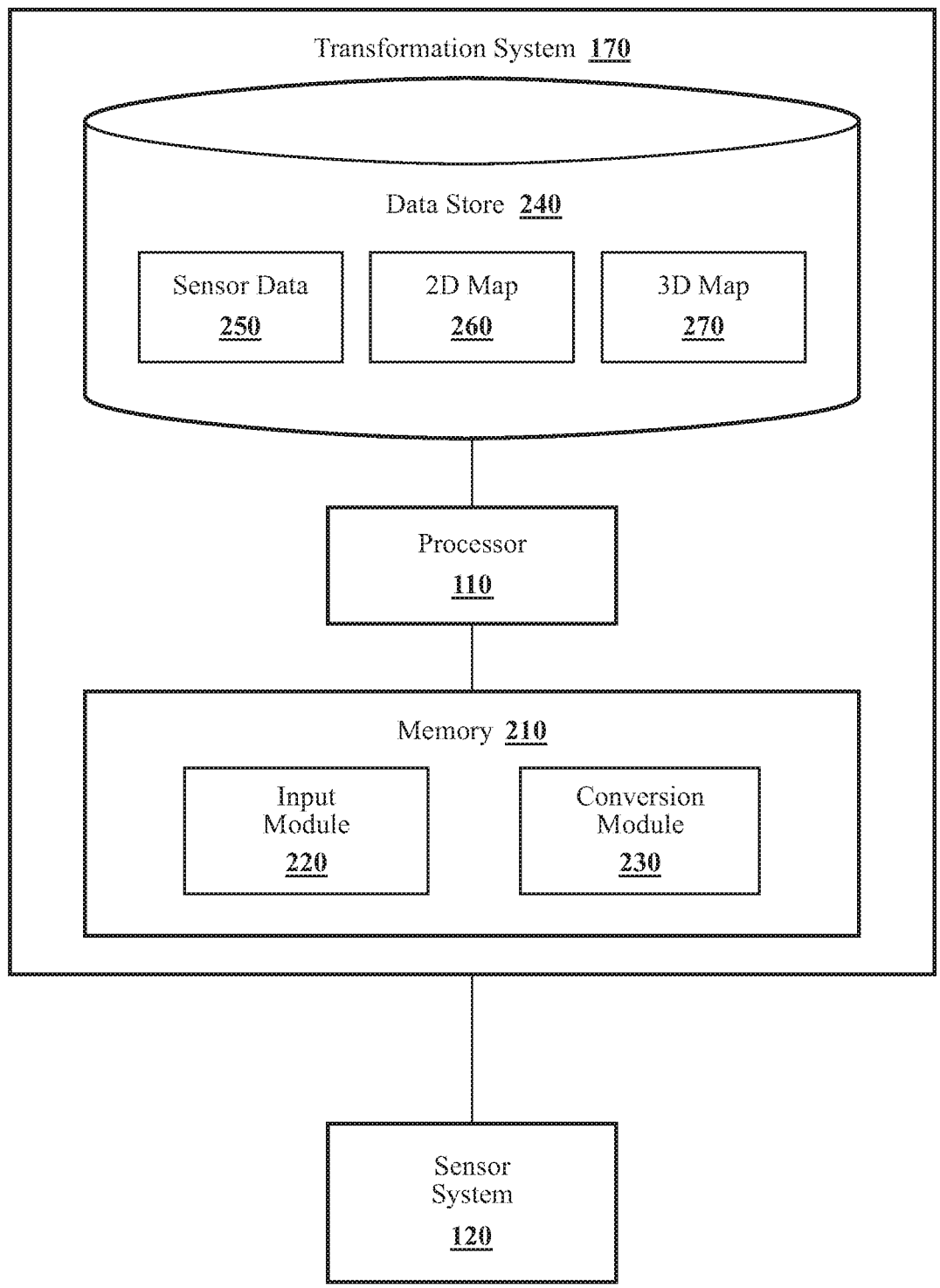
FIG. 2 illustrates one embodiment of a transformation system that is associated with relating coordinates between separate coordinate systems.

With reference to FIG. 2, one embodiment of the transformation system 170 is further illustrated. As shown, the transformation system 170 includes a processor 110. Accordingly, the processor 110 may be a part of the transformation system 170 or the transformation system 170 may access the processor 110 through a data bus or another communication path. In one or more embodiments, the processor 110 is an application-specific integrated circuit that is configured to implement functions associated with an input module 220 and a conversion module 230. In general, the processor 110 is an electronic processor such as a microprocessor or other processing circuitry that is capable of performing various functions as described herein when implemented in combination with the noted instructions and/or modules.

In one embodiment, the transformation system 170 includes a memory 210 that stores the input module 220 and the conversion module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that when executed by the processor 110 cause the processor 110 to perform the various functions disclosed herein. In one or more embodiments, the modules 220 and 230 are embedded in an on-chip memory of the processor 110.

Furthermore, in one embodiment, the transformation system 170 includes a data store 240. The data store 240 is, in one embodiment, an electronic data structure such as a database that is stored in the memory 210 or separately in another memory and that is configured with routines that can be executed by the processor 110 for analyzing stored data, providing stored data, organizing stored data, and so on. Thus, in one embodiment, the data store 240 stores data used by the modules 220 and 230 in executing various functions. Accordingly, in at least one configuration, the data store 240 electronically stores sensor data 250, 2D map 260, and 3D map 270 along with, for example, other information that is used by the modules 220 and 230.

Accordingly, the input module 220 generally includes instructions that function to control the processor 110 to acquire data inputs from one or more sensors of the vehicle 100 (e.g., the sensor system 120) that form sensor data 250. The sensor data 250 embodies observations of the surrounding environment of the vehicle 100 including at least surrounding features such as lanes and nearby regions (e.g., sidewalks) that include any vehicles, pedestrians, or other objects that may be present in the noted areas. While the present discussion will generally focus on acquiring the sensor data 250 using a LiDAR 124, it should be appreciated that the sensor data 250 may include observations from multiple sensors of the vehicle 100 including, for example, radar 123, camera 126, global positioning system (GPS), and so on. Additionally, it should be appreciated that the disclosed approach can be extended to cover further configurations of sensors such as LiDAR sensors with one or more cameras, different types of LiDARs and cameras, combinations of radars and cameras, sonar, or other sensors.

The input module 220, in one embodiment, controls the respective sensors to iteratively provide the data inputs in the form of the sensor data 250. Additionally, while the input module 220 is discussed as controlling the various sensors to provide the sensor data 250, in one or more embodiments, the input module 220 can employ other techniques to acquire the sensor data 250 that are either active or passive. For example, the input module 220 may passively sniff the sensor data 250 from a stream of electronic information provided by the various sensors to further components within the vehicle 100 over a bus (e.g., CAN bus). Moreover, as previously indicated, the input module 220 can undertake various approaches to fuse data from multiple sensors when providing the sensor data 250. Thus, the sensor data 250, in one embodiment, represents a combination of measurements acquired from multiple sensors.

The sensor data 250 itself generally provides observations of surrounding features of the vehicle 100, as previously noted, and can include feature/object detection, relative measurements between the vehicle 100 and surrounding objects (whether explicit or derived via intermediate processing), and so on. Moreover, the input module 220, in one embodiment, controls the sensors to acquire the sensor data 250 about an area that encompasses 360 degrees about the vehicle 100 in order to provide a comprehensive assessment of the surrounding environment. Accordingly, the sensor data 250 can include 3D point cloud data, camera images, and/or video from the camera 126, radar measurements, and so on to facilitate this comprehensive observation.

As such, in one or more embodiments, the input module 220 may acquire the sensor data 250 as part of a localization process. In other words, the input module 220 may execute a process to determine a location of the vehicle 100 by correlating perceived features and locations of the features with a defined mapping of features (e.g., a 3D point cloud). In further aspects, the input module 220 uses GPS coordinates from a navigation system (e.g., navigation system 147). In general, the input module 220 localizes the vehicle 100 to acquire location coordinates for the vehicle 100 that may then be used for further determinations such as determining additional aspects of a surrounding environment (e.g., points of interest), navigation, and so on. In alternative embodiments, the input module 220 acquires the sensor data 250 as map data, a virtualization of an environment, or another set of data that may need to be related to the separate frames of reference embodied by the 2D map 260 and the 3D map 270. In such a case, the transformation system 170 may use the map data directly in place of a localization and location coordinates. That is, the input module 220 may provide coordinates defined according to the map data itself as an initial reference point from which the system 170 generate the intermediate coordinates and performs the remaining aspects of the transformation.

In any case, the input module 220 uses the sensor data 250, in general, to localize the vehicle 100. The input module 220 may localize the vehicle according to different processes depending on a particular implementation but may include filtering (causal inference for online operation) or smoothing (acausal inference for offline processing). For example, the 2D map 260 generally defines a coordinate system about the vehicle 100. In a simplest form, the 2D map 260 is a 2D grid from an overhead perspective of the surroundings of the vehicle 100 defined according to, for example, separate reference axes for longitude and latitude. Thus, the 2D map 260 may define coordinates according to Universal Transverse Mercator (UTM) coordinate system or another distorted map projection. In one aspect, the 2D map defines a third dimension for altitude/elevation by simply projecting the altitude from a surface plane of the surrounding environment within the 2D map 260. In either case, the 2D map 260 may define various sensor data such as a point cloud to which the vehicle 100 may localize in order to determine location coordinates.

Additionally, the 3D map 270 is, in one embodiment, a separate mapping of the surrounding environment of the vehicle 100 that defines various aspects such as roadway configurations, traffic light locations, points of interest (POIs), and other information that the vehicle 100 and/or a passenger may separately use when the vehicle 100 is traveling through the environment. Moreover, the 3D map is encoded in a separate coordinate system relative to the 2D map 260. The coordinate system of the 3D map is a non-distorted three-dimensional map that is based on geodetic datum such as the earth-centered, earth-fixed (ECEF) coordinate system.

Accordingly, the input module 220 upon initially determining the location coordinates from localizing into the surrounding environment according to the 2D map 260, determines an initial point of reference by, for example, selecting reference coordinates. In one embodiment, the input module 220 selects the reference coordinates according to a sensing horizon of the vehicle 100. As used herein, sensing horizon refers to a range at which sensors of the vehicle 100 can produce observations of the surrounding environment. That is, the sensing horizon is generally defined by a range at which the sensors can perceive aspects of the environment associated with the particular sensor. Thus, the input module 220 generally defines the sensing horizon according to a range of one or more sensors that the vehicle 100 uses to localize in the surrounding environment. The one or more sensors may include a LiDAR, a camera, or another suitable sensor.

The input module 220, in one embodiment, selects the reference coordinates at the sensing horizon in a random manner. That is, the input module 220 may randomly select a point on the sensing horizon from which the input module 220 then defines the reference coordinates. In an alternate approach, the input module 220 selects the reference coordinates at the sensing horizon in a direction of travel of the vehicle (i.e., directly ahead). In any case, the input module 220 defines the reference coordinates by selecting three points at the sensing horizon. The input module 220 uses the three points to define the reference coordinates as three standard basis vectors that then provide a mechanism to separately reference the other coordinate systems. It should be appreciated that the standard basis vectors are unit vectors that define directions of axes of a Cartesian coordinate system (e.g., a vehicle frame of reference). In further aspects, where a device separate from the vehicle 100 includes the transformation system 170 and is separately providing transformations for the vehicle 100, the system 170 defines the sensing horizon according to the vehicle 100 and not sensors of the separate device (e.g., statically mounted infrastructure device). Thus, in either occurrence, the system 170 generally defines the reference coordinates at a sensing horizon of the device for which the transformations are to be provided, which as discussed herein, is generally the vehicle 100.

The input module 220 then uses the reference coordinates to generate intermediate coordinates in the respective coordinate systems for which the transformation system 170 is generating the estimated transform. In one embodiment, the input module 220 transforms the reference coordinates into the first coordinate system (e.g., UTM) and into the second coordinate system (e.g., ECEF) to produce references in each of the separate coordinate systems from which the conversion module 230 can produce the estimated transform. Thus, the input module 220, in one approach, executes separate algorithms to produce the first and the second intermediate coordinates. The input module 220 may use a rigid-body transform, in one embodiment, to generate the first intermediate coordinates. The transformation system 170 defines and stores the rigid-body transform for transforming the reference coordinates into the first coordinate system. In one approach, the rigid-body transformation is a 6 degree-of-freedom Euclidean rigid-body transform that belongs to the special Euclidean group SE(3). The input module 220 transforms the reference coordinates into the second coordinate system using an iterative conversion process that iteratively executes to refine a determination until converging on the second intermediate coordinates.

Thus, the input module 220 localizes the vehicle 100 and determines the first and second intermediate coordinates to facilitate the subsequent analysis by the conversion module 230. Continuing with FIG. 2, in one embodiment, the conversion module 230 includes instructions that when executed by the processor 110 cause the processor 110 to generate the estimated transform. In one embodiment, the estimated transform is an optimal rigid-body transform that approximates a relationship between the first coordinate system and the second coordinate system. That is, because the first coordinate system is a distorted 2D map projection of the Earth and the second coordinate system is an undistorted Cartesian coordinate system based on Geodetic datum, an exact transform between the two coordinate systems can not generally be derived. Thus, the conversion module 230 approximates a transform in providing the estimated transform. In general, the estimated transform is a six degree-of-freedom Euclidean rigid-body transform that can be mathematically described as belonging to the special Euclidean group SE(3).

In one approach, the conversion module 230 generates the estimated transform using a least-squares algorithm to analyze the first and the second intermediate coordinates. In one approach, the conversion module 230 implements the least-squares algorithm using a singular value decomposition (SVD). As further explanation consider the following derivation that relates two point sets or coordinate systems $p_i$ and $p'_i$.

$$p'_i = Rp_i + T + N_i \quad (1)$$

Where R is a rotation matrix, T a translation vector and $N_i$ a noise vector. Thus, the conversion module 230 provides the transform as a solution of R and T that is based, at least in part, on the singular value decomposition (SVD) of a 3×3 matrix, given $\{p_i\}$ and $\{p'_i\}$. Consider that $\{p_i\}$ and $\{p'_i\}$ are two 3-D point sets (i.e., the first and second intermediate coordinates), which may be represented by 3×1 matrices. R is a 3×3 rotation matrix, T is a translation vector (3×1 column matrix), and $N_i$ is a noise vector. In general, the analysis aims to find R and T that minimize equation (2).

$$\Sigma^2 = \Sigma_{i=1}^{N} \|p'_i - (Rp_i + T)\| \quad (2)$$

A least squares approach to solving (1) is represented as $\hat{R}$ and $\hat{T}$, then $\{p'_i\}$ and $\{p''_i \triangleq \hat{R}p_i = \hat{T}\}$ have the same centroid, that is, $$p' = p'' \quad (3)$$
where $$p' \triangleq \frac{1}{N}\sum_{i=1}^{N} p'_i \quad (4)$$

$$p'' \triangleq \frac{1}{N}\sum_{i=1}^{N} p''_i = \hat{R}p + \hat{T} \quad (5)$$

$$p \triangleq \frac{1}{N}\sum_{i=1}^{N} p_i \quad (6)$$

Let $$q_i \triangleq p_i - p \quad (7)$$

$$q'_i \triangleq p'_i - p' \quad (8)$$

The above provides for equation (9):

$$\Sigma^2 = \Sigma_{i=1}^{N} \|q'_i - Rq_i\|^2 \quad (9)$$

Therefore, the least-squares analysis implemented by the conversion module 230 is reduced to two parts: (i) Find $\hat{R}$ to minimize $\Sigma^2$ in equation (9), and (ii) the translation $\hat{T}$ is provided by equation (10).

$$\hat{T} = p' - \hat{R}p \quad (10)$$

To solve part (i) consider the following.

First, from $\{p_i\}$ and $\{p'_i\}$ calculate p, p'; and then $\{q_i\}$ and $\{q'_i\}$.

Calculate the 3×3 matrix according to equation (11)

$$H \triangleq \Sigma_{i=1}^{N} q_i q'^t_i \quad (11)$$

Where the superscript t denotes matrix transposition.

Then, the conversion module 230 determines the SVD of H, as shown:

$$H = U\Lambda V^t \quad (12)$$

The conversion module 230 then calculates X, as shown in (13).

$$X = VU^t \quad (13)$$

The conversion module 230 then calculates det (x), and if det (x)=1, then $\hat{R}$=X, which is the desired solution for the rotation. However, if det (x)=−1, then X is a reflection and the conversion module 230, in one embodiment, repeats the process for a different set of reference coordinates and intermediate coordinates by reselecting the reference coordinates and repeating the transformation as discussed in relation to the input module 220. In an alternative approach, the conversion module 230 determines the rotation (R) when det (x)=−1 and one of the singular values of H is zero according to equation (14).

$$X' = V'U^t \quad (14)$$

Where V' is from V by changing the sign of the third column.

Accordingly, after the conversion module 230 produces the estimated transform, the conversion module 230 can use the estimated transform to convert coordinates between the first and the second coordinate systems. For example, the conversion module 230, in one embodiment, projects one or more annotations encoded in the second coordinate system in, for example, the 3D map 270 into the 2D map 260 in the first coordinate system. By way of example, where an autonomous driving module 160 or another component within the vehicle 100 requests an annotation such as a precise location of a traffic light that is encoded within the 3D map 270, the transformation system 170, in one embodiment, generates the estimated transform responsive to the request by localizing, generating the intermediate coordinates, and generating the estimated transform. The transformation system 170 can then retrieve the annotation coordinates of the annotation from the 3D map 270 according to information provided in the request and use the estimated transform to convert the annotation coordinates into a frame of reference of the vehicle 100 (e.g., coordinates of the 2D map 260 such as UTM). In this way, the transformation system 170 improves the process of converting between distorted and undistorted coordinates systems to realize highly accurate estimates using the estimated transform.

Figure 3:
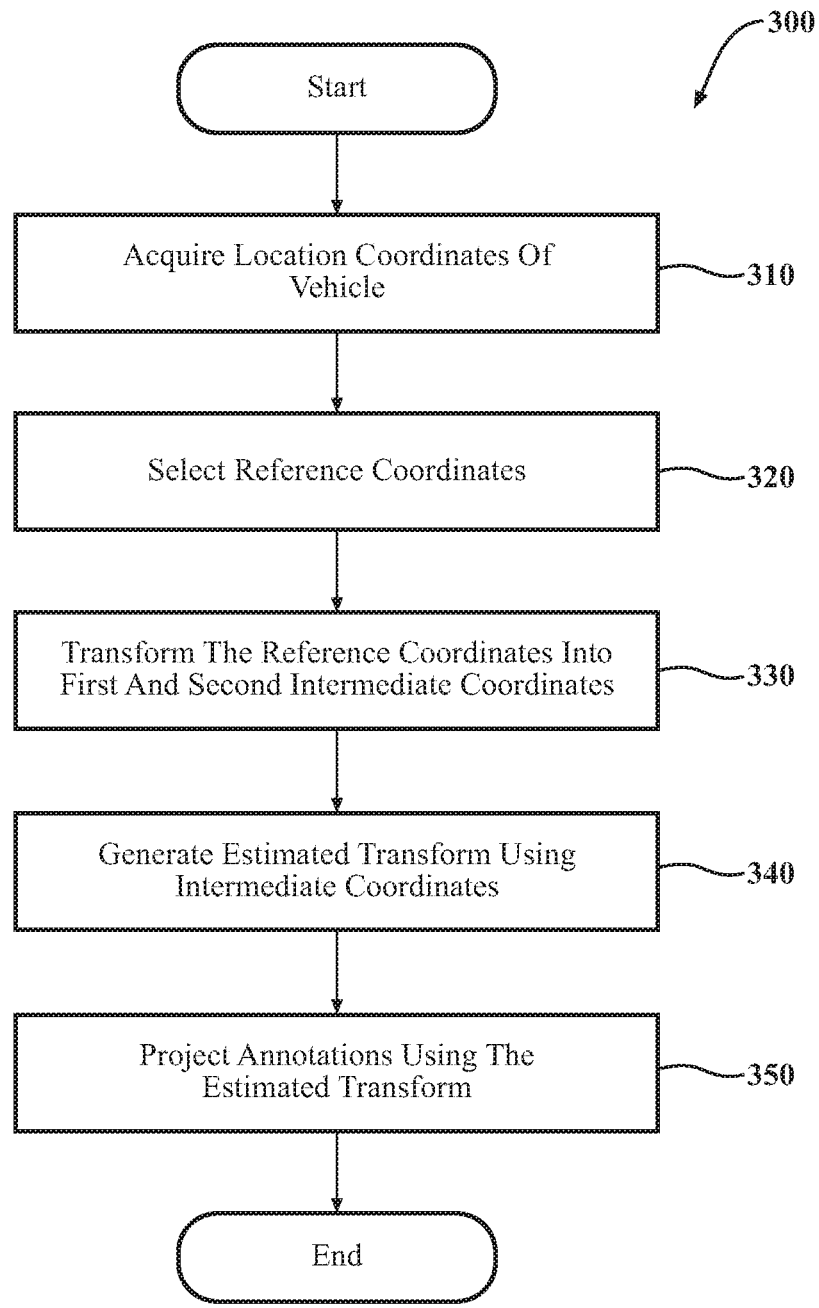
FIG. 3 is a flowchart illustrating one embodiment of a method associated with generating a transform for converting coordinates between different coordinate systems.

As a further explanation of how the present approach provides for estimating a transform to convert coordinates between a distorted coordinate system and an undistorted coordinate system, consider FIG. 3, which illustrates one embodiment of a method 300 associated with generating an estimated transform. Method 300 will be discussed from the perspective of the transformation system 170 of FIGS. 1-2. While method 300 is discussed in combination with the transformation system 170, it should be appreciated that the method 300 is not limited to being implemented within the transformation system 170 but is instead one example of a system that may implement the method 300. Moreover, while FIG. 3 illustrates the flowchart of method 300 in a serial manner, it should be appreciated that one or more of the noted functions may execute in parallel.

As an initial note, the method 300 is shown as initiating with a localization process at 310, however, in one or more embodiments, a request from one or more components within the vehicle 100 may separately invoke the method 300. For example, as previously indicated, the autonomous driving module 160, a navigation system 147, and/or another system/component of the vehicle 100 may generate and communicate a request for information encoded in the 3D map 270 that is to be related to the map 260 in order to, for example, relate the information to the present frame of reference of the vehicle 100. The request itself may include information about the location and/or the particular aspect that is to be converted into a coordinate system of the 2D map 260. For example, the request may specify a type of information for a particular area (e.g., traffic-related information, POI information, etc.) and/or a specific item (e.g., traffic lights at an identified intersection).

Thus, the noted modules/systems may automatically generate the requests and/or the systems may generate the requests according to manual electronic inputs via a user to invoke the method 300. In yet further embodiments, the transformation system 170 independently performs the method 300 iteratively and projects various relevant annotations automatically or upon a specific event that is separate from the generation of the estimated transform. In any case, the method 300 improves the At 310, the input module 220 acquires location coordinates for the vehicle 100. In one embodiment, the process of acquiring the location coordinates is a multi-step process involving, for example, acquiring the sensor data 250, analyzing the sensor data 250 against the map 260, and identifying the location coordinates as a location of the vehicle 100 within the surrounding environment as defined according to the map 260.

Consequently, the input module 220 generally controls the sensor system 120 to acquire the sensor data 250 as an initial aspect of localizing the vehicle 100. In one embodiment, the input module 220 controls, for example, the LiDAR sensor 124 of the vehicle 100 to observe the surrounding environment. Alternatively, or additionally, the input module 220 controls the camera 126 and/or another sensor to acquire the sensor data 250. As part of controlling the sensors to acquire the sensor data 250, it is generally understood that the sensors acquire the sensor data 250 of a region around the vehicle 100 and out to a sensing horizon. As previously specified, the sensing horizon is a distance from the vehicle 100 out to which the sensor(s) can perceive aspects of the surrounding environment. Thus, the sensing horizon is generally defined in relation to the sensor or sensors even though discussed in relation to the vehicle 100. As a further note, the sensor data 250 may generally take the form of a point cloud from a LiDAR, images from stereo/monocular cameras, radar returns from radar and/or sonar, lat/long coordinates from a GPS, etc. Thus, the sensor data 250 is generally envisioned as data representing a 3D space and thus may take the form of voxels or other 3D representations.

Moreover, in further embodiments, the input module 220 controls the sensors to acquire the sensor data 250 at successive iterations or time steps. Thus, the transformation system 170, in one embodiment, iteratively executes the functions discussed at block 310 to acquire the sensor data 250 and perform various other actions according thereto such as localizing the vehicle 100. The input module 220 uses the sensor data 250 to acquire the location coordinates of the vehicle. The process of localization may involve different processes according to a particular implementation but generally involves correlating the sensor data 250 with a defined mapping such as the map 260. In this way, the vehicle 100 can determine a location within the surrounding environment from which various additional determinations may be derived such as navigation, autonomous control, planning, informational cues for riders, and so on.

At 320, the input module 220 selects reference coordinates relative to the location coordinates. In one approach, the input module 220 implements a heuristic that accounts for the location coordinates, aspects of the surrounding environment, attributes of the sensors, and other factors to determine the sensing horizon and select the reference coordinates. For example, the input module 220 may select three non-colinear points in three-dimensional space according to a position of the vehicle 100 in the surrounding environment and such that the points are proximate to the sensing horizon of the vehicle 100. The input module 220 then uses the points to define three standard basis vectors as the reference coordinates thereby establishing reference frame of the vehicle 100 from which the system can establish additional relationships to facilitate determination of the transform.

At 330, the input module 220 transforms the reference coordinates. In one embodiment, to further prepare information for determining the estimated transform, the input module 220 initially transforms the reference coordinates into first intermediate coordinates and second intermediate coordinates. The first intermediate coordinates are coordinates encoded in a first coordinate system that is based, at least in part, on a distorted two-dimensional map projection (e.g., UTM). The second intermediate coordinates are, for example, coordinates encoded in a second coordinate system (e.g., ECEF) that is a Cartesian coordinate system associated with a Geodetic datum (i.e., ellipsoid Earth Gravitational Model (EGM)) and that is not distorted as in the case of the first coordinate system. Thus, relating the first and the second coordinate system presents a unique complexity, which the first and the second intermediate coordinates facilitate overcoming.

As previously discussed, the input module 220 may implement various algorithms to generate the intermediate coordinates and generally uses distinct algorithms for each set of coordinates to account for unique characteristics of the different coordinate systems. Accordingly, the input module 220, in one embodiment, implements one or more rigid-body transforms to convert the reference coordinates into the first intermediate coordinates whereas the input module 220 implements an iterative conversion heuristic to convert the reference coordinates into the second intermediate coordinates. It should be appreciated that each separate transformation into the distinct coordinate systems are associated with unique complexities for which the different approaches provide a robust mechanism to perform the transformation.

At 340, the conversion module 230 generates the estimated transform. In one embodiment, the conversion module 230 uses the first intermediate coordinates and the second intermediate coordinates as inputs into a least-squares algorithm as previously described. The conversion module 230 generates the estimated transform as an optimal transform for relating the first coordinate system and the second coordinate system. That is, because an explicit/direct transform does not generally exist between distorted and undistorted coordinate spaces, the conversion module 230 generates the estimated transform as an optimal solution that best approximates a relationship of the coordinate systems within the current environment of the vehicle 100. Thus, the conversion module 230 generates the estimated transform using a cost function as an integral part of the least-squares algorithm to minimize a difference of the reference coordinates when transformed between the first coordinate system and the second coordinate system.

In any case, the conversion module 230 generates the estimated transform as a Euclidean rigid-body transform belonging to the special Euclidean group SE(3). While separate coordinate systems may be implemented with the present approach, the conversion module 230 generally functions to relate coordinates encoded in the Universal Transverse Mercator (UTM) coordinate system with coordinates encoded in the earth-centered, earth-fixed (ECEF) coordinate system.

At 350, the conversion module 230 projects one or more annotations. In one embodiment, the conversion module 230 operates to project coordinates encoded in the second coordinate system (e.g., undistorted) into the first coordinate system (e.g., distorted) using the estimated transform. In further approaches, the conversion module 230 may also project coordinates from the first coordinate system into the second coordinate system. As previously described, the annotations may include map annotations that are encoded in a separate coordinate system from a frame of reference of the vehicle 100. However, as noted, in various aspects, the conversion module 230 may separately convert coordinates in the first coordinate system into the second coordinate system. For example, a location of the vehicle 100, a location of a perceived object, or any other perceived and located aspect may be converted into the second coordinate system for various reasons such as to communicate information about a perceived object to other devices that may be operating according to the second coordinate system. In either case, the conversion module 230 provides a robust mechanism through producing the estimated transform to account for differences in the coordinate systems and provide an accurate conversion so that information encoded in either respective system is not isolated from use by any individual system.

Figure 4:
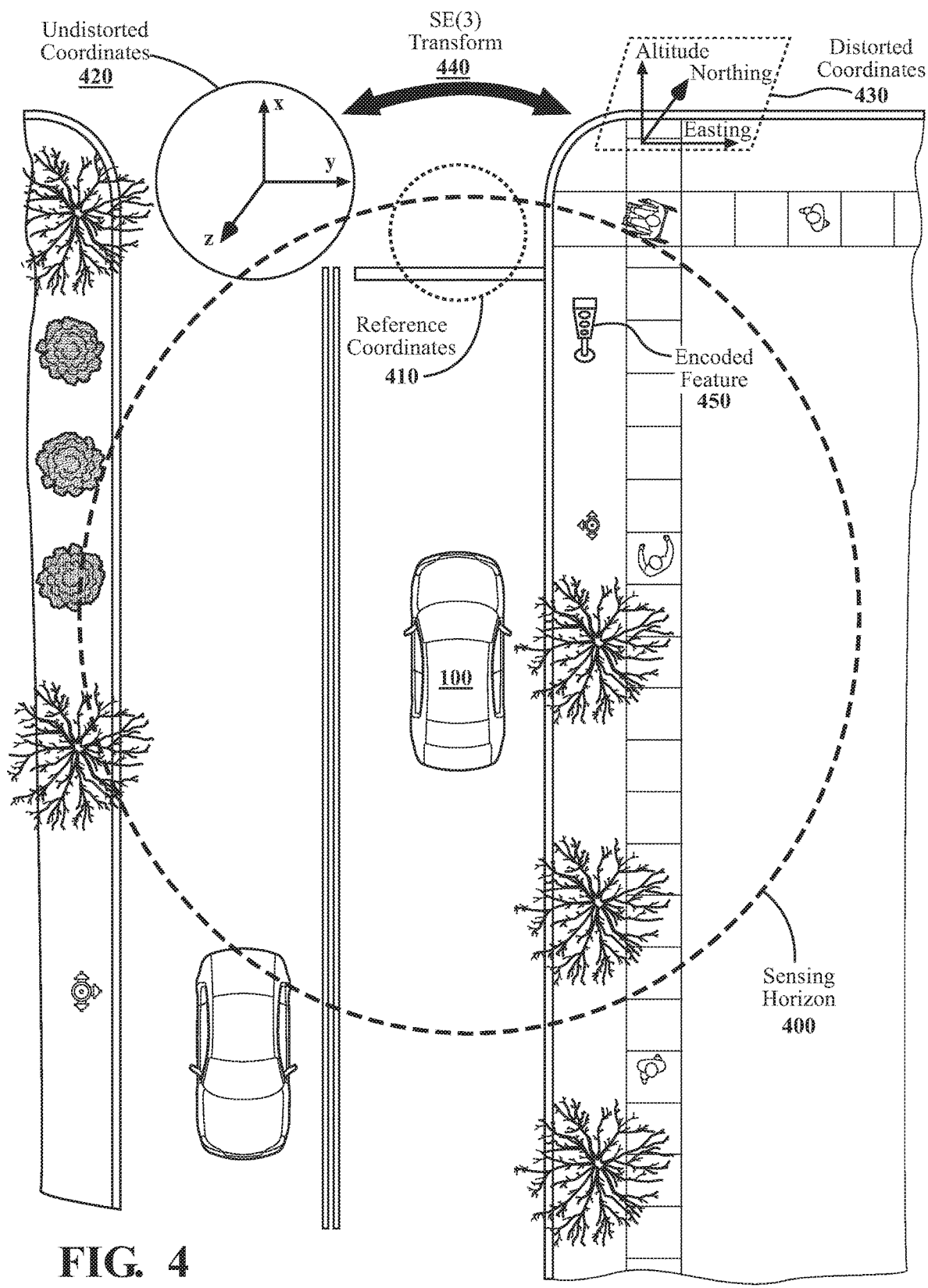
FIG. 4 is a diagram illustrating one example of a vehicle implementing the disclosed systems and methods.

As a further explanation of how the transformation system 170 functions to generate the estimated transform and convert coordinates therebetween, an example occurrence of the transformation system 170 executing within an environment will now be discussed in relation to FIG. 4. FIG. 4 is a diagram depicting an environment around the vehicle 100 that is perceived according to the sensing horizon 400 by sensors of the vehicle 100. The sensing horizon 400 generally represents a limit of the distance of the perceived environment of the vehicle 100. Thus, the system 170 generally functions to acquires sensor data and localize within the environment. According to this localization, the system 170 selects reference coordinates 410 at the sensing horizon 400. As shown, the reference coordinates are located in a forward direction of travel of the vehicle 100.

The system 170 uses the reference coordinates 410 to generate intermediate coordinates in an undistorted coordinate system 420 (e.g., ECEF), and separately in a distorted coordinate system 430 (e.g., UTM). From these intermediate coordinates, the system 170 executes the least-squares analysis to produce an estimated SE(3) transform 440. The transform 440 provides the vehicle 100 and components thereof the ability to then seamlessly convert aspects encoded in one coordinate system into the other without noticeable loss of fidelity in the coordinates. Thus, consider that the vehicle 100 is traveling through the environment and detects a feature 450 in the environment, the system 170 may use the transform 440 to convert coordinates of a perceived location of the feature 450 from the distorted coordinates 430 into the undistorted coordinates 420. The system 170 or another system may then correlate the feature against, for example, the map 270 to identify/verify the feature 450. Alternatively, the system 170 may convert coordinates of the feature 450 from the undistorted coordinates 420 into the distorted coordinates 430 in order to relate the feature 450 into a frame of reference of the vehicle 100 as the vehicle 100, for example, approaches an intersection and seeks additional contextual information. In this way, the transformation system 170 improves the conversion of coordinates between distorted and undistorted coordinate systems to better relate information encoded in disparate systems for use by the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the transformation system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the transformation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the transformation system 170, and/or the autonomous driving module(s) 160 may control some or all of these vehicle systems 140 and, thus, may be partially or fully autonomous.

The processor(s) 110, the transformation system 170, and/or the autonomous driving module(s) 160 can be operatively connected to communicate with the various vehicle systems 140 and/or individual components thereof. For example, returning to FIG. 1, the processor(s) 110, the transformation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the transformation system 170, and/or the autonomous driving module(s) 160 may control some or all of these vehicle systems 140.

The processor(s) 110, the transformation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the transformation system 170, and/or the autonomous driving module(s) 160 can control the direction and/or speed of the vehicle 100. The processor(s) 110, the transformation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the transformation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the software update 250 as implemented by the conversion module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A transformation system for relating coordinates between separate coordinate systems, comprising:
   one or more processors;
   a memory communicably coupled to the one or more processors and storing:
   an input module including instructions that when executed by the one or more processors cause the one or more processors to acquire location coordinates of a vehicle in a surrounding environment according to sensor data from at least one sensor of the vehicle,
   wherein the input module includes instructions to transform reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum; and
   a conversion module including instructions that when executed by the one or more processors cause the one or more processors to generate, using the first intermediate coordinates and the second intermediate coordinates, an estimated transform for converting input coordinates between the first coordinate system and the second coordinate system, the input coordinates being encoded in the first coordinate system or the second coordinate system,
   wherein the conversion module includes instructions to project one or more annotations encoded in the second coordinate system into the first coordinate system using the estimated transform.

2. The transformation system of claim 1, wherein the conversion module includes instructions to generate the estimated transform including instructions to process the first intermediate coordinates and the second intermediate coordinates according to a least-squares algorithm that uses a singular value decomposition (SVD) to estimate the estimated transform as an optimal transform for relating the first coordinate system and the second coordinate system, and
   wherein the estimated transform is a Euclidean rigid-body transform belonging to the special Euclidean group SE(3).

3. The transformation system of claim 1, wherein the input module includes instructions to select the reference coordinates relative to the location coordinates by selecting three non-colinear points in three-dimensional space according to a localization of the vehicle to define three standard basis vectors as the reference coordinates.

4. The transformation system of claim 3, wherein the input module includes instructions to acquire the location coordinates including instructions to localize the vehicle in the surrounding environment using the sensor data,
   wherein the input module includes instructions to select the reference coordinates including instructions to select the reference points proximate to a sensing horizon of the vehicle,
   wherein the reference coordinates define the standard basis vectors for a reference frame of the vehicle, and
   wherein the sensing horizon defines boundaries of the surrounding environment that are sensed by the vehicle.

5. The transformation system of claim 1, wherein the one or more annotations include map annotations that are encoded in a separate coordinate system relative to a localization of the vehicle, and wherein the conversion module includes instructions to project the one or more annotations including instructions to transform annotation coordinates of the one or more annotations to relate the annotations to a localization of the vehicle, and
   wherein the Geodetic datum is ellipsoid Earth Gravitational Model (EGM) that is an undistorted three-dimensional coordinate system of the Earth.

6. The transformation system of claim 1, wherein the conversion module includes instructions to transform the reference coordinates including instructions to apply a special Euclidean group 3 (SE(3)) set of transformations to the reference coordinates to generate the first intermediate coordinates in the first coordinate system, and apply an iterative conversion heuristic to the reference coordinates to generate the second intermediate coordinates in the second coordinate system.

7. The transformation system of claim 1, wherein the first coordinate system is Universal Transverse Mercator (UTM) coordinate system and the second coordinate system is earth-centered, earth-fixed (ECEF) coordinate system.

8. The transformation system of claim 1, wherein the conversion module includes instructions to generate the estimated transform including instructions to use a cost function to minimize a difference of the reference coordinates when transformed between the first coordinate system and the second coordinate system.

9. A non-transitory computer-readable medium for relating coordinates between separate coordinate systems and including instructions that when executed by one or more processors cause the one or more processors to:

acquire location coordinates of a vehicle in a surrounding environment according to sensor data from at least one sensor of the vehicle;

transform reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum; and generate, using the first intermediate coordinates and the second intermediate coordinates, an estimated transform for converting input coordinates between the first coordinate system and the second coordinate system, the input coordinates being encoded in the first coordinate system or the second coordinate system.

10. The non-transitory computer-readable medium of claim 9, wherein the instructions to generate the estimated transform include instructions to process the first intermediate coordinates and the second intermediate coordinates according to a least-squares algorithm that uses a singular value decomposition (SVD) to estimate the estimated transform as an optimal transform for relating the first coordinate system and the second coordinate system, and wherein the estimated transform is a Euclidean rigid-body transform belonging to the special Euclidean group SE(3).

11. The non-transitory computer-readable medium of claim 9, wherein the instructions to select the reference coordinates relative to the location coordinates include instructions to select three non-colinear points in three-dimensional space according to a localization of the vehicle to define three standard basis vectors as the reference coordinates.

12. The non-transitory computer-readable medium of claim 9, wherein the instructions to transform the reference coordinates include instructions to apply a special Euclidean group 3 (SE(3)) set of transformations to the reference coordinates to generate the first intermediate coordinates in the first coordinate system, and apply an iterative conversion heuristic to the reference coordinates to generate the second intermediate coordinates in the second coordinate system.

13. The non-transitory computer-readable medium of claim 9, wherein the instructions further include instructions to project one or more annotations encoded in the second coordinate system into the first coordinate system using the estimated transform, wherein the one or more annotations include map annotations that are encoded in a separate coordinate system relative to a localization of the vehicle, and wherein the instructions to project the one or more annotations include instructions to transform annotation coordinates of the one or more annotations to relate the annotations to a localization of the vehicle.

14. A method of relating coordinates between separate coordinate systems, comprising:

acquiring location coordinates of a vehicle in a surrounding environment according to sensor data from at least one sensor of the vehicle;

transforming reference coordinates associated with the location coordinates into first intermediate coordinates associated with a first coordinate system that is based, at least in part, on a distorted two-dimensional map projection, and second intermediate coordinates associated with a second coordinate system that is a Cartesian coordinate system associated with a Geodetic datum;

generating, using the first intermediate coordinates and the second intermediate coordinates, an estimated transform for converting between the first coordinate system and the second coordinate system; and projecting one or more annotations encoded in the second coordinate system into the first coordinate system using the estimated transform.

15. The method of claim 14, wherein generating the estimated transform includes processing the first intermediate coordinates and the second intermediate coordinates according to a least-squares algorithm that uses a singular value decomposition (SVD) to estimate the estimated transform as an optimal transform for relating the first coordinate system and the second coordinate system, and wherein the estimated transform is a Euclidean rigid-body transform belonging to the special Euclidean group SE(3).

16. The method of claim 14, further comprising:

selecting the reference coordinates relative to the location coordinates by selecting three non-colinear points in three-dimensional space according to a localization of the vehicle to define three standard basis vectors as the reference coordinates.

17. The method of claim 16, wherein acquiring the location coordinates includes localizing the vehicle in the surrounding environment using the sensor data, wherein selecting the reference coordinates includes selecting the reference points proximate to a sensing horizon of the vehicle, wherein the reference coordinates define the standard basis vectors for a reference frame of the vehicle, and wherein sensing horizon defines boundaries of the surrounding environment that are sensed by the vehicle.

18. The method of claim 14, wherein the one or more annotations include map annotations that are encoded in a separate coordinate system relative to a localization of the vehicle, wherein projecting the one or more annotations includes transforming annotation coordinates of the one or more annotations to relate the annotations to the localization of the vehicle, and wherein the Geodetic datum is ellipsoid Earth Gravitational Model (EGM) that is an undistorted three-dimensional coordinate system of the Earth.

19. The method of claim 14, wherein transforming the reference coordinates includes applying a special Euclidean group 3 (SE(3)) set of transforms to the reference coordinates to generate the first intermediate coordinates in the first coordinate system, and applying an iterative conversion heuristic to the reference coordinates to generate the second intermediate coordinates in the second coordinate system.

20. The method of claim 14, wherein the first coordinate system is Universal Transverse Mercator (UTM) coordinate system and the second coordinate system is earth-centered, earth-fixed (ECEF) coordinate system, and wherein generating the estimated transform includes using a cost function to minimize a difference of the reference coordinates when transformed between the first coordinate system and the second coordinate system.

* * * * *